United States Patent
Liao

(10) Patent No.: US 10,030,723 B1
(45) Date of Patent: Jul. 24, 2018

(54) BRAKE CALIPER

(71) Applicant: Chih-Hsien Liao, Taichung (TW)

(72) Inventor: Chih-Hsien Liao, Taichung (TW)

( * ) Notice: Subject to any disclaimer, the term of this patent is extended or adjusted under 35 U.S.C. 154(b) by 0 days.

(21) Appl. No.: 15/622,151

(22) Filed: Jun. 14, 2017

(51) Int. Cl.
  *F16D 55/22* (2006.01)
  *F16D 55/224* (2006.01)
  *F16D 55/227* (2006.01)
  *F16D 65/097* (2006.01)
  *F16D 65/00* (2006.01)
  *F16D 55/00* (2006.01)

(52) U.S. Cl.
  CPC ....... *F16D 55/2245* (2013.01); *F16D 55/227* (2013.01); *F16D 65/0075* (2013.01); *F16D 65/0971* (2013.01); *F16D 2055/002* (2013.01); *F16D 2055/0029* (2013.01)

(58) Field of Classification Search
  CPC .............. F16D 55/2245; F16D 55/227; F16D 65/0075; F16D 65/0971; F16D 2055/002; F16D 2055/0029; F16D 65/14; F16D 65/18
  See application file for complete search history.

(56) References Cited

U.S. PATENT DOCUMENTS

| 3,954,160 | A  | * | 5/1976 | Carr ........................ | F16D 65/18 188/106 F |
| 2009/0014257 | A1 | * | 1/2009 | Watada .................... | F16D 65/18 188/17 |
| 2016/0032995 | A1 | * | 2/2016 | Nishino ................ | F16D 55/225 188/72.3 |

\* cited by examiner

*Primary Examiner* — Melanie Torres Williams
(74) *Attorney, Agent, or Firm* — Trop Pruner & Hu, P.C.

(57) ABSTRACT

A brake caliper includes a lining unit and a hand-brake unit. The hand-brake unit includes a driving member, and first and second push members respectively abutting against an abutment portion and an urging portion of the driving member. The urging portion has an inclined urging surface. The second push member has an inclined abutment surface in slidable contact with the urging surface. When the driving member is rotated, the urging surface pushes the abutment surface to move the first and second push members toward each other for actuating the lining unit to frictionally contact a brake disk.

6 Claims, 5 Drawing Sheets

BRAKE CALIPER

FIELD

The disclosure relates to a caliper, and more particularly to a brake caliper.

BACKGROUND

A conventional brake caliper disclosed in Taiwanese Utility Model Patent No. M394267 is used with a brake disk, and includes a main body unit, a swing arm unit pivoted to the main body unit, a lining unit, a hand-brake cable unit and a piston unit. The main body unit has an operating space. The swing arm unit includes two swing arms that are pivoted to the main body unit and that are respectively located at two opposite sides of the operating space. The lining unit includes two linings each of which is disposed between the brake disk and a respective one of the swing arms. The hand-brake cable unit includes an outer tube that abuts against one of the swing arms, and a cable that extends through the outer cable and that has an end connected to the other one of the swing arms, and an opposite end connected to a hand-brake lever.

The conventional brake caliper can be actuated to inhibit rotation of the brake disk by the piston unit or by the hand-brake cable unit.

Another conventional brake caliper disclosed in Taiwanese Utility Model Patent No. M415088 is also used with a brake disk, and includes a main body unit, a piston unit, a lining unit and a hand-brake unit. The main body unit includes first and second side seats that cooperatively define an operating space therebetween. The lining unit includes first and second positioning members that are associated with the piston unit, and first and second linings that are respectively mounted to the first and second positioning members. The hand-brake unit includes a driving member, a first push member and a second push member. The first and second push members are respectively driven by first and second driving portions of the driving member to respectively push the first and second linings to contact and inhibit rotation of the brake disk.

SUMMARY

An object of the disclosure is to provide a brake caliper that has a novel structure.

According to the disclosure, the brake caliper is used with a brake disk. The brake disk has a rotating axis, and opposite first and second end surfaces perpendicular to the rotating axis. The brake caliper includes a main body unit, a piston unit, a lining unit and a hand-brake unit. The main body unit includes first and second side seats that are located respectively at two sides of the brake disk and adjacent respectively to the first and second end surfaces. The first and second side seats are interconnected and cooperatively define an operating space therebetween that partially receives the brake disk. The first side seat has at least one first oil chamber that faces toward the first end surface of the brake disk. The second side seat has at least one second oil chamber that faces toward the second end surface of the brake disk. The piston unit includes at least one first piston that is movably disposed in the first oil chamber, and at least one second piston that is movably disposed in the second oil chamber. The lining unit includes first and second positioning members that are movably disposed in the operating space, and first and second linings that are respectively mounted to the first and second positioning members. The first positioning member is associated with the first piston. The second positioning member is associated with the second piston. The hand-brake unit includes a driving member that extends along a central axis and that is mounted to the first and second side seats, a first push member that is disposed between the first side seat and the first positioning member, and a second push member that is disposed between the second side seat and the second positioning member. The central axis is parallel to the rotating axis. The driving member has an elongated rod body that extends along the central axis, an operating portion that is disposed at a longitudinal end of the rod body, an abutment portion that is fixedly disposed at the other longitudinal end of the rod body opposite to the operating portion and that is for abutment against the first push member, and an urging portion that is fixedly disposed on the rod body, that is located between the operating portion and the abutment portion, and that has an inclined urging surface oblique to the central axis and facing toward the abutment portion. The first push member is disposed at one side of the abutment portion proximate to the urging portion, and is formed with a first through hole that permits the driving member to movably extend therethrough. The second push member is disposed at one side of the urging portion proximate to the abutment portion, is formed with a second through hole that permits the driving member to movably extend therethrough, and has an inclined abutment surface that is oblique to the central axis and that is for being in slidable contact with the urging surface of the driving member. When the driving member is rotated about the central axis relative to the first and second push members to generate a relative rotational movement between the inclined urging surface and the inclined abutment surface, the urging surface of the driving member pushes the abutment surface of the second push member to move the first and second push members toward each other so as to push the first and second linings to respectively and frictionally contact the first and second end surfaces of the brake disk for inhibiting rotation of the brake disk.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
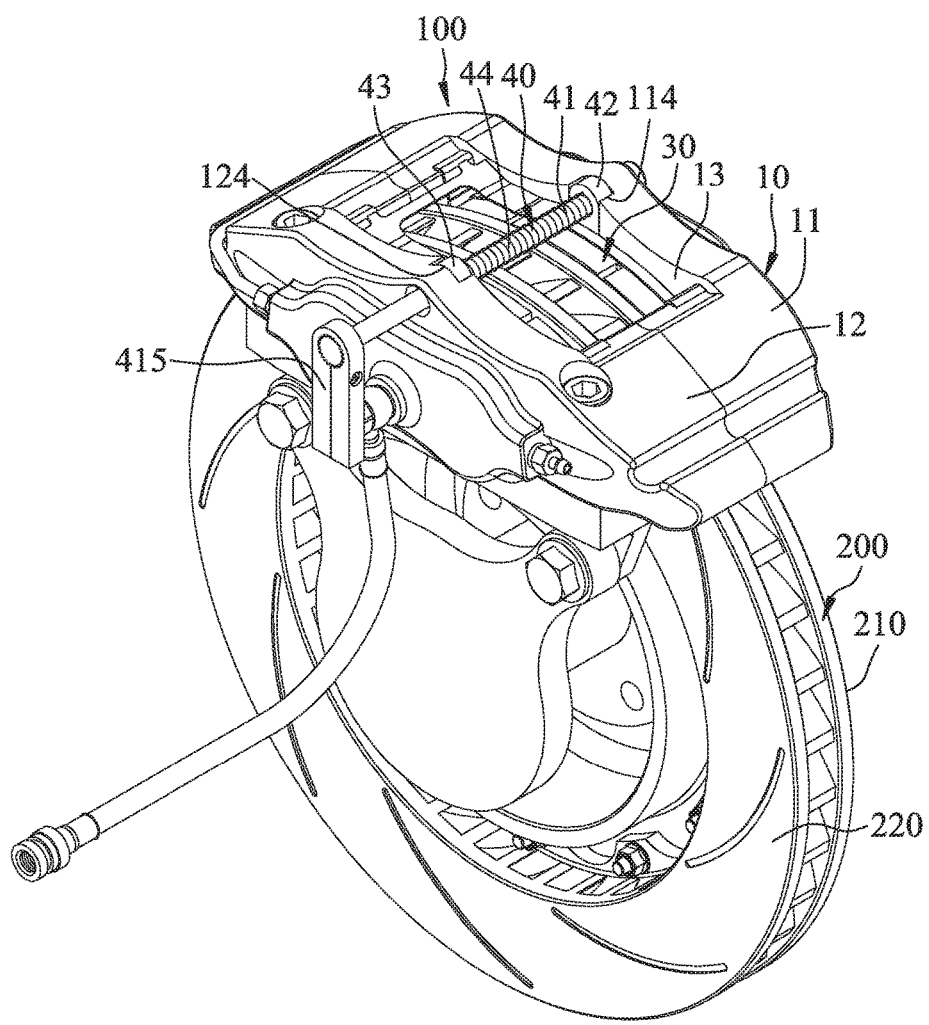
FIG. 1 is a perspective view illustrating an embodiment of the brake caliper according to the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
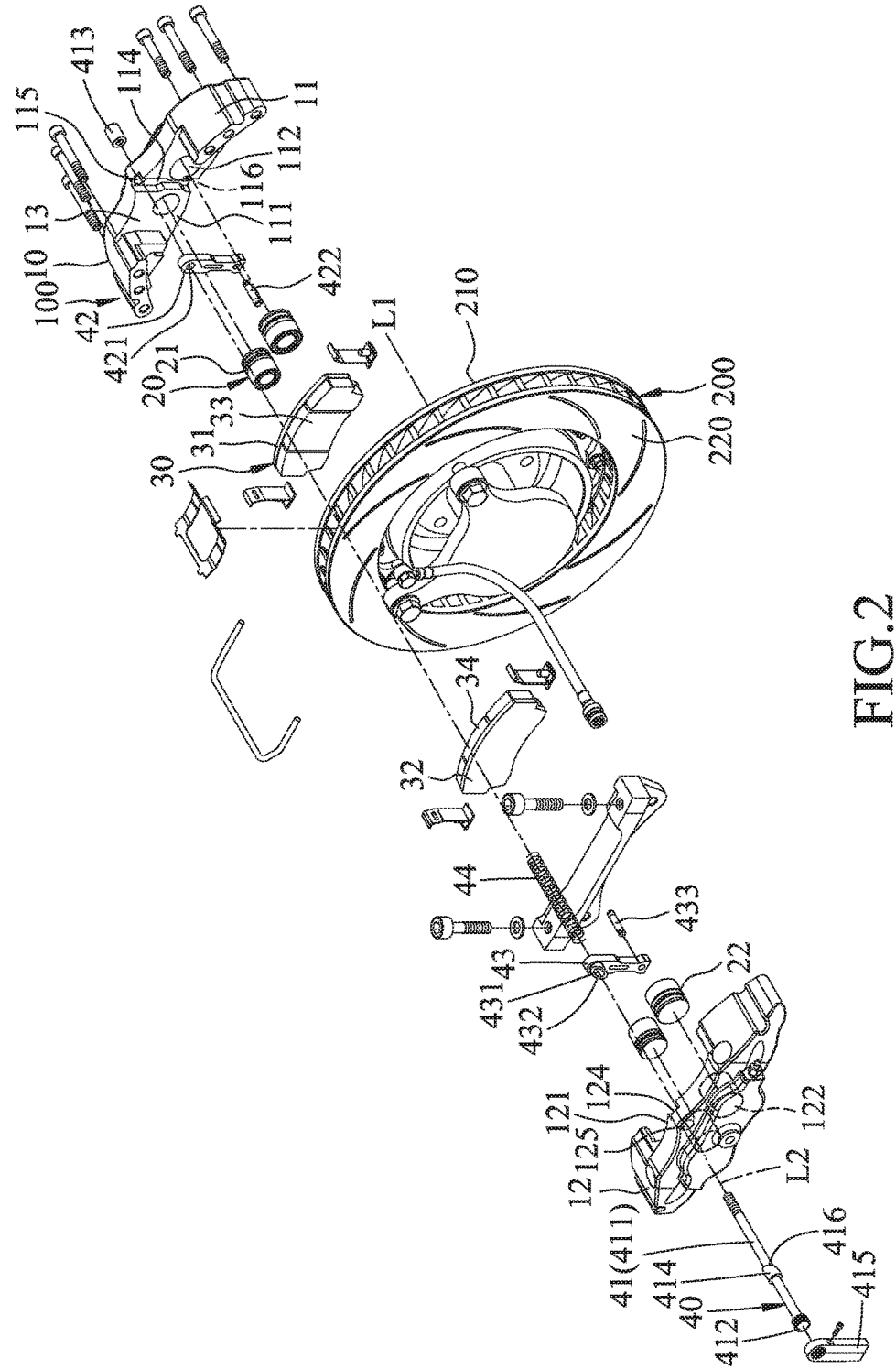
FIG. 2 is an exploded perspective view illustrating the embodiment.
Figure 3:
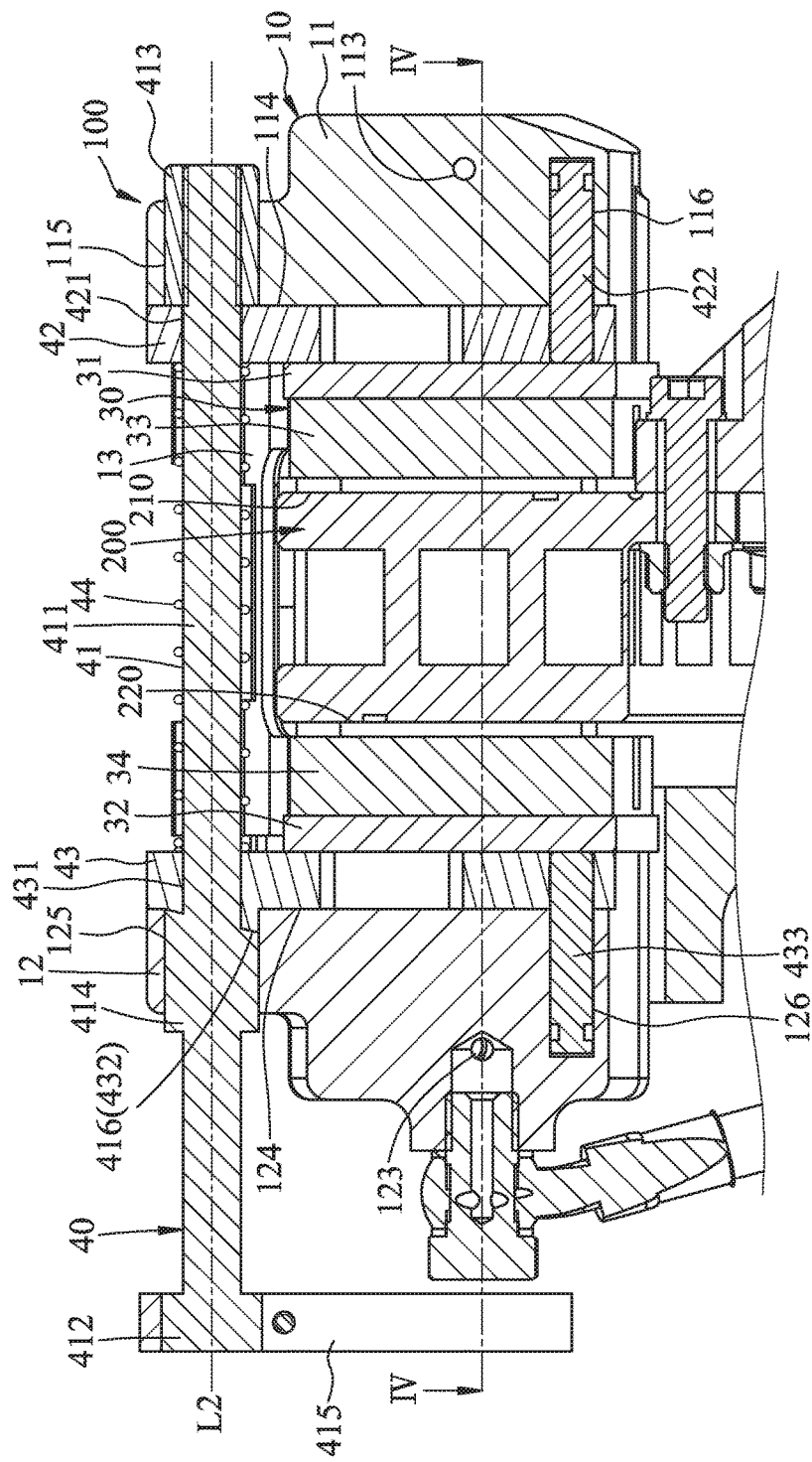
FIG. 3 is a schematic sectional view illustrating the embodiment when not being operated.

Referring to FIGS. 1 to 3, an embodiment of the brake caliper 100 according to this disclosure is used with a brake disk 200, and cooperates with the brake disk 200 to serve as a parking brake. The brake disk 200 has a rotating axis (L1), and opposite first and second end surfaces 210, 220 perpendicular to the rotating axis (L1). The brake caliper 100 includes a main body unit 10, a piston unit 20, a lining unit 30, and a hand-brake unit 40.

The main body unit 10 includes first and second side seats 11, 12 located respectively at two sides of the brake disk 200 and adjacent respectively to the first and second end surfaces 210, 220. The first and second side seats 11, 12 are interconnected, and cooperatively define an operating space 13 therebetween that partially receives the brake disk 200. The first side seat 11 has a first inner side surface 111 that faces toward the operating space 13, two first oil chambers 112 that are formed in the first inner side surface 111, a first oil path 113 that is in fluid communication with the first oil chambers 112, a first engaging groove 114 that is formed in the first inner side surface 111 and that is located between the first oil chambers 112, a first axle hole 115 that is in spatial communication with an upper portion of the first engaging groove 114, and a first slide hole 116 that is in spatial communication with a lower portion of the first engaging groove 114. The first axle hole 115 extends along a central axis (L2) that is parallel to the rotating axis (L1). The first slide hole 116 extends in an axis parallel to the rotating axis (L1) and the central axis (L2). The second side seat 12 has a second inner side surface 121 that faces toward the operating space 13, two second oil chambers 122 that are formed in the second inner side surface 121, a second oil path 123 that is in fluid communication with the second oil chambers 122, a second engaging groove 124 that is formed in the second inner side surface 121 and that is located between the second oil chambers 122, a second axle hole 125 that is in spatial communication with an upper portion of the second engaging groove 124, and a second slide hole 126 that is in spatial communication with a lower portion of the second engaging groove 124. The second axle hole 125 extends along the central axis (L2), and is aligned with the first axle hole 115. The second slide hole 126 extends in an axis parallel to the rotating axis (L1) and the central axis (L2).

The piston unit 20 includes two first pistons 21 that are respectively disposed in the first oil chambers 112 and that are movable in the direction of the central axis (L2), and two second pistons 22 that are respectively disposed in the second oil chambers 122 and that are movable in the direction of the central axis (L2).

The lining unit 30 includes first and second positioning members 31, 32 that are disposed in the operating space 13 and that are movable in the direction of the central axis (L2), and first and second linings 33, 34 that are respectively mounted to the first and second positioning members 31, 32. The first positioning member 31 is driven by the first pistons 21. The second positioning member 32 is driven by the second pistons 22. In this embodiment, the first and second positioning members 31, 32 are respectively located at two opposite sides of the brake disk 200 along the rotating axis (L1). The first lining 33 is located between the first positioning member 31 and the brake disk 200. The second lining 34 is located between the second positioning member 32 and the brake disk 200.

The hand-brake unit 40 includes a driving member 41 extending along the central axis (L2), a first push member 42 driven by the driving member 41, a second push member 43 driven by the driving member 41, and a resilient member 44 sleeved on the driving member 41.

The driving member 41 is mounted to the first and second side seats 11, 12, and has an elongated rod body 411 that extends along the central axis (L2), an operating portion 412 that is disposed at a longitudinal end of the rod body 411, an abutment portion 413 that is fixedly disposed at the other longitudinal end of the rod body 411 opposite to the operating portion 412 and that has a diameter larger than that of the rod body 411, an urging portion 414 that is fixedly disposed on the rod body 411 and that is located between the operating portion 412 and the abutment portion 413, and a driven portion 415 that is mounted to the operating portion 412 and that is operable to rotate the rod body 411 about the central axis (L2). In one embodiment, the abutment portion 413 is configured as a tubular member that is threadedly fixed to the rod body 411 and that is for abutment against the first push member 42. The urging portion 414 has an inclined urging surface 416 that is oblique to the central axis (L2) and that faces toward the abutment portion 413. In one embodiment, the abutment portion 413 movably extends into the first axle hole 115 of the first side seat 11, and the urging portion 414 movably extends into the second axle hole 125 of the second side seat 12.

The first push member 42 is disposed between the first side seat 11 and the first positioning member 31, and is disposed at one side of the abutment portion 413 proximate to the urging portion 414. The first push member 42 slidably engages the first engaging groove 114 of the first side seat 11, and is movable relative to the first side seat 11 along the central axis (L2). The first push member 42 is formed with a first through hole 421 that permits the rod body 411 to movably extend therethrough, and has a first pin 422 that is slidable along the first slide hole 116.

The second push member 43 is disposed between the second side seat 12 and the second positioning member 32, and is disposed at one side of the urging portion 414 proximate to the abutment portion 413. The second push member 43 slidably engages the second engaging groove 124 of the second side seat 12, and is movable relative to the second side seat 12 along the central axis (L2). The second push member 43 is formed with a second through hole 431 that permits the rod body 411 to movably extend therethrough. The second push member 43 has a second pin 433 that is slidable along the second slide hole 126, and an inclined abutment surface 432 that is oblique to the central axis (L2) and that is for being in slidable contact with the urging surface 416 of the driving member 41.

The resilient member 44 is sleeved on the rod body 411, and has two opposite ends respectively abutting against the first and second push members 42, 43 for resiliently biasing the first and second push members 42, 43 away from each other.

Figure 4:
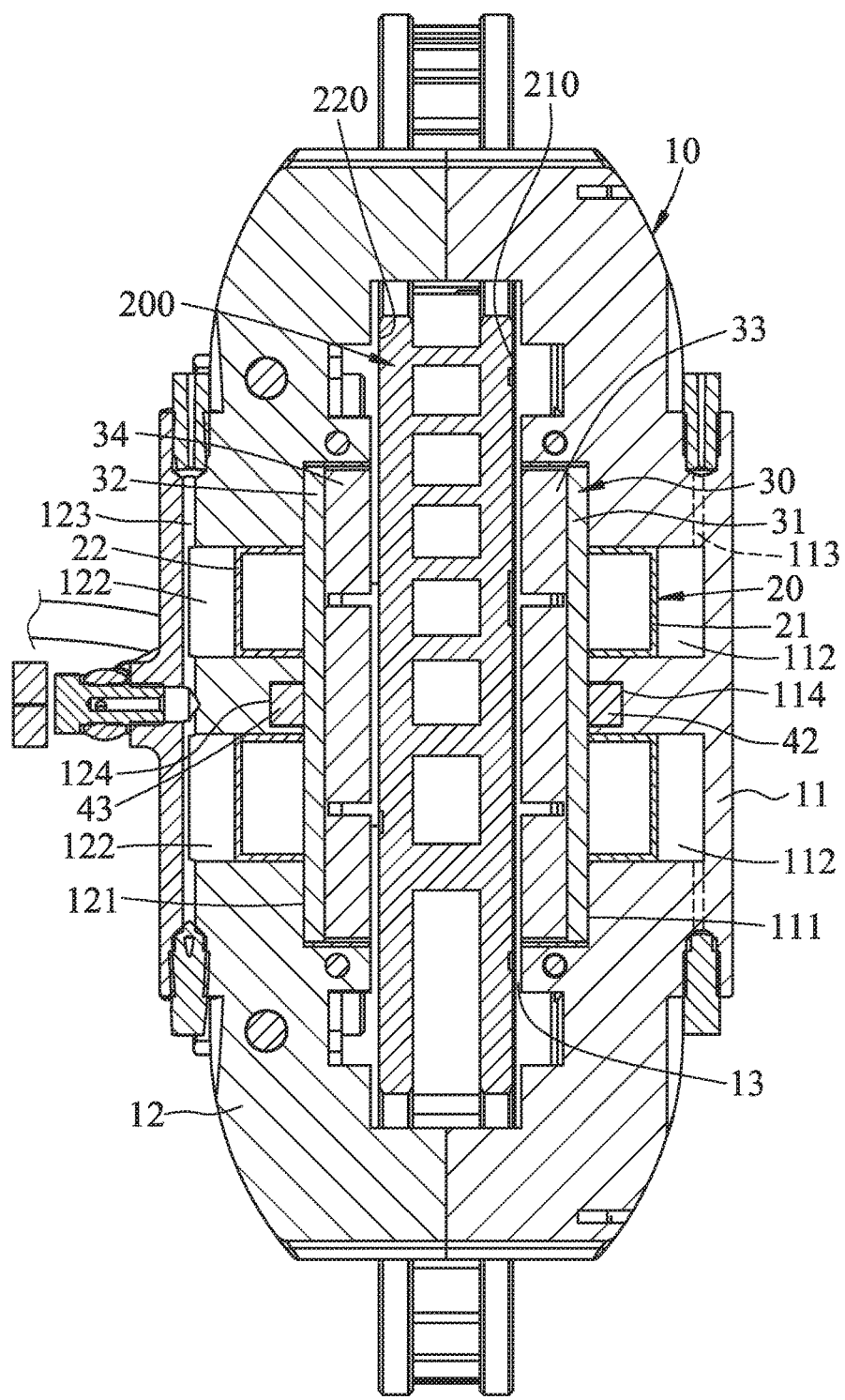
FIG. 4 is a schematic sectional view taken along line IV-IV in FIG. 3, illustrating the embodiment when not being operated.

Referring to FIGS. 3 and 4, when the brake caliper 100 is not being operated, the first lining 33 is spaced apart from the first end surface 210 of the brake disk 200, and the second lining 34 is spaced apart from the second end surface 220 of the brake disk 200, so that the brake disk 200 is permitted to rotate freely. At this time, a distance between the first and second push members 42, 43 is relatively long, and the urging surface 416 of the driving member 41 and the abutment surface 432 of the second push member 43 substantially cling to each other.

When a user steps on a brake pedal (not shown), an oil pump (not shown) pumps oil into the first oil chambers 112 via the first oil path 113, and into the second oil chambers 122 via the second oil path 123, so that the first pistons 21 are moved toward the brake disk 200 to push the first positioning member 31 and the first lining 33 against the first end surface 210 of the brake disk 200, and that the second pistons 22 are moved toward the brake disk 200 to push the second positioning member 32 and the second lining 34 against the second end surface 220 of the brake disk 200 to inhibit rotation of the brake disk 200.

Figure 5:
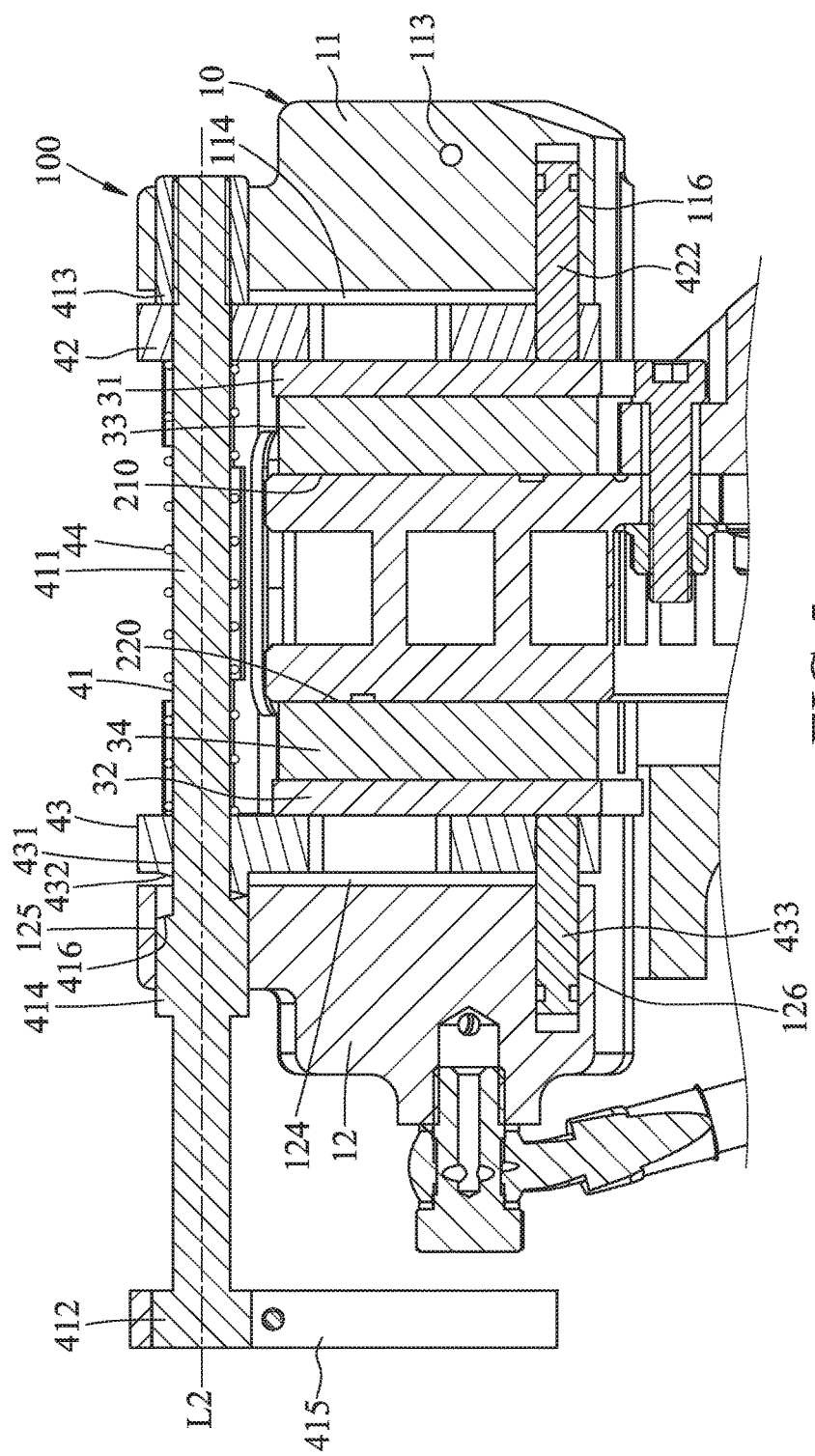
FIG. 5 is another schematic sectional view illustrating a hand-brake unit of the embodiment when being operated.

Referring further to FIG. 5, when the user pulls a hand brake lever (not shown) that is associated with the driven portion 415, the driven portion 415 is driven to rotate the driving member 41 about the central axis (L2) relative to the first and second push members 42, 43, so that the urging surface 416 of the driving member 41 pushes the abutment surface 432 of the second push member 43 to move the second push member 43 toward the first push member 42 so as to reduce the distance between the first and second push members 42, 43. During the relative movement of the first and second push members 42, 43 toward each other, the first push member 42 pushes the first positioning member 31 and the first lining 33 toward the first end surface 210 of the brake disk 200, and the second push member 43 pushes the second positioning member 32 and the second lining 34 toward the second end surface 220 of the brake disk 200 until the first and second linings 33, 34 are respectively in frictional contact with the first and second end surfaces 210, 220 for inhibiting rotation of the brake disk 200. The first pin 422 of the first push member 42 slides along the first slide hole 116, so that the first push member 42 moves smoothly relative to the first side seat 11 and is prevented from rotating about the central axis (L2) relative to the first side seat 11. The second pin 433 of the second push member 43 slides along the second slide hole 126, so that the second push member 43 moves smoothly relative to the second side seat 12 and is prevented from rotating about the central axis (L2) relative to the second side seat 12. At this time, the resilient member 44 is compressed to generate a restoring force.

By rotating the driving member 41 to generate the relative rotational movement between the inclined urging surface 416 and the inclined abutment surface 432, the first and second push members 42, 43 can be moved toward each other to move the first and second linings 33, 34 to frictionally contact the brake disk 200 for inhibiting rotation of the brake disk 200.

When the hand brake lever is released such that the driving member 41 is rotated in an opposite direction, the urging surface 416 is rotated relative to the abutment surface 432, so as to permit the resilient member 44 to bias the first and second push members 42, 43 to move away from each other, and to permit the first and second linings 33, 34 to move back to their original position, as shown in FIG. 3.

In summary, the brake caliper 100 of this disclosure can be actuated by the brake pedal or by the hand brake lever for inhibiting rotation of the brake disk 200, has a relatively simple structure, and can be assembled easily.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A brake caliper adapted to be used with a brake disk, the brake disk having a rotating axis, and opposite first and second end surfaces perpendicular to the rotating axis, said brake caliper comprising:

a main body unit including first and second side seats that are located respectively at two sides of the brake disk and adjacent respectively to the first and second end surfaces, said first and second side seats being interconnected and cooperatively defining an operating space therebetween that is adapted to partially receive the brake disk, said first side seat having at least one first oil chamber that is adapted to face toward the first end surface of the brake disk, said second side seat having at least one second oil chamber that is adapted to face toward the second end surface of the brake disk;

a piston unit including at least one first piston that is movably disposed in said first oil chamber, and at least one second piston that is movably disposed in said second oil chamber;

a lining unit including first and second positioning members that are movably disposed in said operating space, and first and second linings that are respectively mounted to said first and second positioning members, said first positioning member being associated with said first piston, said second positioning member being associated with said second piston; and a hand-brake unit including a driving member that extends along a central axis and that is mounted to said first and second side seats, a first push member that is disposed between said first side seat and said first positioning member, and a second push member that is disposed between said second side seat and said second positioning member, the central axis being parallel to the rotating axis, said driving member having an elongated rod body that extends along the central axis, an operating portion that is disposed at a longitudinal end of said rod body, an abutment portion that is fixedly disposed at the other longitudinal end of said rod body opposite to said operating portion and that is for abutment against said first push member, and an urging portion that is fixedly disposed on said rod body, that is located between said operating portion and said abutment portion, and that has an inclined urging surface oblique to the central axis and facing toward said abutment portion, said first push member being disposed at one side of said abutment portion proximate to said urging portion, and being formed with a first through hole that permits said driving member to movably extend therethrough, said second push member being disposed at one side of said urging portion proximate to said abutment portion, being formed with a second through hole that permits said driving member to movably extend therethrough, and having an inclined abutment surface that is oblique to the central axis and that is for being in slidable contact with said urging surface of said driving member;

wherein, when said driving member is rotated about the central axis relative to said first and second push members to generate a relative rotational movement between said inclined urging surface and said inclined abutment surface, said urging surface of said driving member pushes said abutment surface of said second push member to move said first and second push members toward each other so as to push said first and second linings to respectively and frictionally contact the first and second end surfaces of the brake disk for inhibiting rotation of the brake disk.

2. The brake caliper as claimed in claim 1, wherein said driving member of said hand-brake unit further has a driven portion that is mounted to said operating portion and that is operable to rotate said driving member about the central axis.

3. The brake caliper as claimed in claim 2, wherein said first side seat further has a first axle hole that permits said abutment portion of said driving member to rotatably extend thereinto, and said second side seat further has a second axle hole that permits said urging portion of said driving member to rotatably extend thereinto.

4. The brake caliper as claimed in claim 1, wherein said first side seat further has a first engaging groove, and said second side seat further has a second engaging groove, said first push member slidably engaging said first engaging groove of said first side seat, and being movable relative to said first side seat along the central axis, said second push member slidably engaging said second engaging groove of said second side seat, and being movable relative to said second side seat along the central axis.

5. The brake caliper as claimed in claim 4, wherein said first side seat further has a first slide hole that extends in an axis parallel to the central axis, and said second side seat further has a second slide hole that extends in an axis parallel to the central axis, said first push member having a first pin that is slidable along said first slide hole, said second push member having a second pin that is slidable along said second slide hole.

6. The brake caliper as claimed in claim 1, wherein said hand-brake unit further includes a resilient member that is sleeved on said rod body of said driving member, and that has two opposite ends respectively abutting against said first and second push members for resiliently biasing said first and second push members away from each other.

* * * * *